(12) United States Patent
Davis et al.

(10) Patent No.: US 7,471,296 B2
(45) Date of Patent: *Dec. 30, 2008

(54) FORMATTING OBJECT FOR MODIFYING THE VISUAL ATTRIBUTES OF VISUAL OBJECTS TO REFLECT DATA VALUES

(75) Inventors: Randall Davis, Redmond, WA (US); Jeff Couckuyt, Bothell, WA (US); Paul Davies, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,540

(22) Filed: Feb. 13, 2007

(65) Prior Publication Data

US 2007/0132762 A1 Jun. 14, 2007

Related U.S. Application Data

(63) Continuation of application No. 10/903,280, filed on Jul. 30, 2004, now Pat. No. 7,176,925, which is a continuation of application No. 09/596,604, filed on Jun. 19, 2000, now Pat. No. 6,822,650.

(51) Int. Cl.
*G06T 11/20* (2006.01)
(52) U.S. Cl. ..................................... 345/441
(58) Field of Classification Search ................. 345/441
See application file for complete search history.

(56) References Cited

U.S. PATENT DOCUMENTS 5,257,349 A 10/1993 Alexander .................... 709/1

(Continued)

OTHER PUBLICATIONS

Visual display, pointing, and natural language: the power of multimodal interaction Antonella De Angeli, Walter Gerbino, Giulia Cassano, Daniela Petrelli May 1998 AVI '98: Proceedings of the working conference on Advanced visual interfaces Publisher: ACM.*

(Continued)

*Primary Examiner*—Kee M Tung
*Assistant Examiner*—Javid A Amini
(74) *Attorney, Agent, or Firm*—Merchant & Gould, P.C.

(57) ABSTRACT

A formatting object according to the present invention conveys information to the reader of a document (such as a table or chart) by associating visual attributes (such as color, fill type, border width, line width, line style, font size, marker size and marker type) to characters or markers within the document. The formatting object may be used to emphasize data within a table or a chart by modifying the structural visual attributes of characters or markers within the table or chart according to pre-defined criteria. Similarly, the formatting object may be used to increase information density within a table or chart, and to elegantly represent the relationships between four or more interrelated variables in a two-dimensional chart. The formatting object accomplishes this by defining at least one format map that comprises one or more mapping segments. Each mapping segment includes a beginning boundary value, an ending boundary value, at least one beginning visual attribute corresponding to the beginning boundary value, and at least one ending visual attribute corresponding to the ending boundary value. The formatting object uses the information within the format maps, in combination with interpolation techniques, to determine one or more visual attributes that correspond to data points falling within the various mapping segments. The formatting object then expresses the data values by applying the appropriate visual attribute to a visual object displayed on a computer screen.

20 Claims, 11 Drawing Sheets

U.S. PATENT DOCUMENTS

| | | | | |
|---|---|---|---|---|
| 5,581,677 | A | | 12/1996 | Myers et al. ................. 345/440 |
| 5,633,946 | A | * | 5/1997 | Lachinski et al. ............ 382/103 |
| 5,794,178 | A | * | 8/1998 | Caid et al. ...................... 704/9 |
| 5,860,075 | A | | 1/1999 | Hashizume et al. .......... 715/530 |
| 6,222,540 | B1 | | 4/2001 | Sacerdoti ..................... 345/581 |
| 6,418,430 | B1 | | 7/2002 | DeFazio et al. ................. 707/3 |
| 6,822,650 | B1 | * | 11/2004 | Davis et al. .................. 345/441 |
| 7,176,925 | B2 | * | 2/2007 | Davis et al. .................. 345/441 |
| 2002/0157116 | A1 | | 10/2002 | Jasinschi ..................... 725/136 |
| 2003/0053708 | A1 | | 3/2003 | Kryukov et al. .............. 382/261 |
| 2004/0107277 | A1 | * | 6/2004 | Levesque et al. ............. 709/223 |
| 2004/0181554 | A1 | * | 9/2004 | Heckerman et al. ....... 707/104.1 |
| 2005/0010117 | A1 | * | 1/2005 | Agutter et al. ............... 600/484 |
| 2007/0132762 | A1 | * | 6/2007 | Davis et al. .................. 345/441 |

OTHER PUBLICATIONS

Nonvisual presentation of graphical user interfaces: contrasting two approaches Elizabeth D. Mynatt, Gerhard Weber Apr. 1994 CHI '94: Proceedings of the SIGCHI conference on Human factors in computing systems: celebrating interdependence Publisher: ACM.*

An object-oriented power system model and graphical information display system for control engineersIronmonger, S.N.; Bushnell, M.J.; Patel, R.; Bradley, M.E.; Vaughan, B.W.;Power System Control and Management, Fourth International Conference on (Conf. Publ. No. 421)Apr. 16-18, 1996 pp. 120-124.*

Koch, Michael, Murray, Sarah with Roth, Werner, "Using Star Office: Special Edition," Sep. 1999, pp. 577-578, QUE, Indianapolis, Indiana.

Frances Mary Modugno University of Washington and Albert T. Corbett and Brad A. Myers, Graphical Representation of Programs in a Demonstrational Visual Shell—An Empirical Evaluation, Carnegie Mellon University; vol. 4, No. 3, 1997, pp. 276-306.

Plaisant, Catherine, Milash, Brett, Rose, Anne, Widoff, Seth et al., LifeLines: Visualizing Personal Histories; Vancouver, British Columbia, Canada, p. 221-ff., Publication: 1996 ISBN: 0-89791-777-4.

Baeza-Yates, Ricardo, Visualization of Large Answers in Text Databases, Gubbio, Italy, Session: Interfaces to databases table of contents, pp. 101-107, Year of Publication: 1996 ISBN: 0-89791-834-7.

* cited by examiner

FIG. 1 – Prior Art Chart Representing the Motion of a Projectile
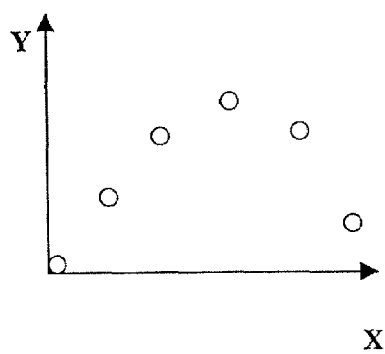
FIG. 2 – Prior Art Chart Representing the Motion of a Projectile Including Z-Coordinates
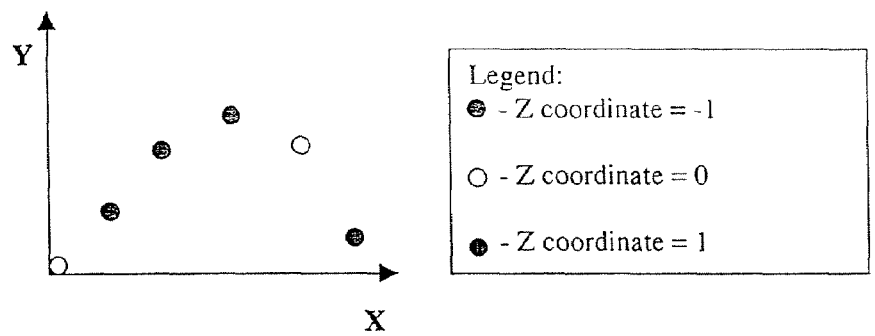

FIG. 3 – Prior Art Chart Representing the Motion of a Projectile Including Z-Coordinates and Time
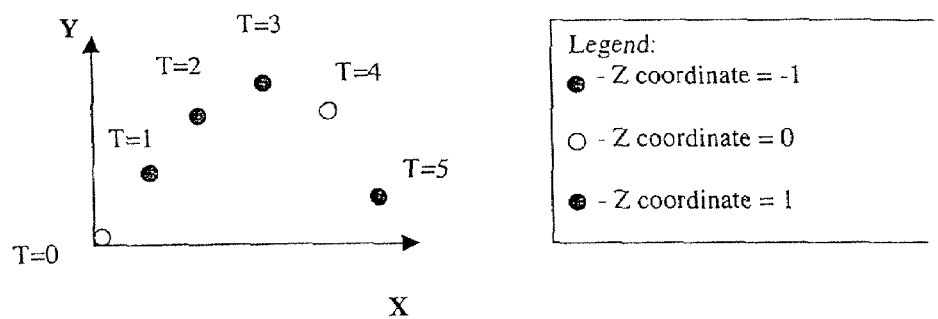

140lbs →→→→→→→→→→→→ 200lbs

140lbs
Line Weight = 0.5 points

200lbs
Line Weight = 2.5 points

140lbs
Line Weight = 0.5 points
Marker Diameter = 1/8"

200lbs
Line Weight = 2.5 points
Marker Diameter = 3/8"

140lbs
Line Weight = 0.5 points
Marker Diameter = 1/8"

170lbs
Line Weight = 1.5 points
Marker Diameter = 1/4"

200lbs
Line Weight = 2.5 points
Marker Diameter = 3/8"

FIG. 16
First Format Map:
Weight = 140 lbs  ⟶  Weight=200 lbs
Line Weight = 0.5 points        Line Weight = 2.5 points
Second Format Map:
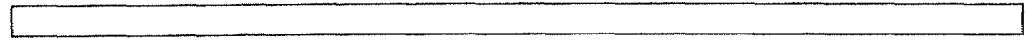
Height=5'0"  ⟶  Height=6'2"
Diameter of Marker = 1/8"        Diameter of Marker = 1/2"

FORMATTING OBJECT FOR MODIFYING THE VISUAL ATTRIBUTES OF VISUAL OBJECTS TO REFLECT DATA VALUES

RELATED APPLICATIONS

This application is a continuation of prior U.S. patent application Ser. No. 10/903,280, entitled "Formatting Object for Modifying the Visual Attributes of Visual Objects to Reflect Data Values," filed Jul. 30, 2004, now U.S. Pat. No. 7,176,925, which is a continuation of prior U.S. patent application Ser. No. 09/596,604, entitled "Formatting Object for Modifying the Visual Attributes of Visual Objects to Reflect Data Values," filed Jun. 19, 2000, now U.S. Pat. No. 6,822,650, both applications which are hereby incorporated by reference in their entirety.

TECHNICAL FIELD

The present invention relates generally to a system and method for visually conveying information and more particularly to a system and method for conveying information by modifying the visual attributes of visual objects to reflect the value of one or more variables.

BACKGROUND

Individuals often have the need to visually convey information to others. In the past, standard tables and charts have been used to express such information. A standard table consists of a systematic arrangement of rows and columns of interrelated data. An example of such a table is shown below in Table 1.

TABLE 1

Motion of a Projectile

| Position on X Axis (ft) | Position on Y Axis (ft) |
|---|---|
| 0 | 0 |
| 1 | 4 |
| 2 | 6 |
| 3 | 7 |
| 4 | 6 |
| 5 | 3 |

A standard chart consists of a graphical representation of the relationships between two or more interrelated variables. An example of such a chart, depicting the corresponding X and Y coordinates of a moving projectile, is shown in FIG. 1.

Generally, all of the entries in a standard table are presented in the same format. For example, all entries in the table of FIG. 1 have the same font (Times), the same font size (12 point), and the same font color (black). Thus, it is difficult to emphasize certain entries within standard tables.

Similarly, all of the markers in a standard chart are also normally presented in the same format. For example, all of the markers in the chart of FIG. 1 have the same line width (0.75 point), the same marker size (⅛ inch), and the same marker shape (circular). Thus, it is also difficult to emphasize entries within standard charts.

It is often desirable to visually demonstrate the relationships between more than two interdependent variables in a table. For example, in the projectile example discussed above, the user may wish to present information regarding the movement of the projectile along a Z-axis perpendicular to both the X-axis and the Y-axis (i.e., use a two-dimensional table for a three-dimensional representation). In addition, the user may wish visually represent information concerning the time, after the object is set into motion, at which the projectile reaches each point along the X-axis.

Traditionally, the relationships between four interdependent variables have been depicted in a tabular format by creating a table having four columns; one column for each independent variable. Thus, in the example discussed above, an author could use known methods to create a table depicting the relationships between the four interdependent variables (X-position, Y-position, Z-position, and time) by adding two new columns to the table shown in FIG. 1. Such a table is shown below as Table 2. The disadvantage of this technique is that it makes the table larger and more complex than a table having fewer columns.

TABLE 2

The Motion of a Projectile including Z-Coordinates and Time

| Position on X Axis (ft) | Position Y Axis (ft) | Position on Z Axis (ft) | Time (seconds) |
|---|---|---|---|
| 0 | 0 | 0 | 0 |
| 1 | 4 | −1 | 1 |
| 2 | 6 | −1 | 2 |
| 3 | 7 | −1 | 3 |
| 4 | 6 | 0 | 4 |
| 5 | 3 | 1 | 5 |

It is also often desirable to visually demonstrate the relationships between more than two interdependent variables in a two-dimensional chart. Traditionally, authors have depicted the relationships between three interdependent variables in a chart by first creating a two-dimensional chart to display the relationship between two of the interdependent variables, as shown in FIG. 2, and then coloring the chart's markers to represent the relationship between the third interdependent variable and the two variables already depicted. Such a technique is commonly used in topographical maps to indicate changes in elevation.

Thus, returning to the example above, an author could use known techniques to indicate the Z-position of the projectile in the chart of FIG. 2 by first establishing a legend of colors corresponding to various Z-coordinates and then coloring each of the markers according to the legend. An example of such a technique is shown in FIG. 2 below.

Authors have not been successful in developing an elegant technique for displaying the relationships between four or more interdependent variables in a two-dimensional chart. Authors often indicate values of a fourth variable by writing the value of the fourth variable next to the appropriate marker as shown below in FIG. 3. However, such a technique causes charts to be cluttered and difficult to read.

Thus, there is a need for a method for emphasizing certain entries in visual representations of information such as tables and charts. There is also a need for a method for increasing the amount of information that can be displayed within a table without increasing the physical size of the table. Similarly, there is a need for a method of increasing the amount of information that can be displayed within a chart without making the chart difficult to read. Thus, there is a need for a method of increasing the information density within a table or a chart. There is also a need for a method of efficiently representing the interrelationships between four or more interrelated variables in a two-dimensional chart.

SUMMARY OF THE INVENTION

The present invention solves the problems associated with standard visual data presentation techniques by using visual attributes (such as color, fill type, border width, line width, line style, font size, marker size and marker type) of characters or markers to convey information to the reader. In particular, the invention emphasizes data within a table or a chart by modifying the visual attributes of characters or markers within the table or chart if the characters or markers represent values meeting specified criteria. For example, the invention can emphasize all data points with negative values by increasing the line width of the characters or markers that represent data points having values less than zero.

Similarly, the invention can increase information density within a table or chart and thus, for example, elegantly represent the relationships between four or more interrelated variables in a two-dimensional chart. The invention accomplishes this by associating data values with corresponding visual attributes. These visual attributes are then applied to a character or marker within a table, chart, or other visual representation to visually express the data values. Thus, for example, the invention might use the size of a marker within a chart to indicate speed. In such a chart, large markers might indicate greater speed and smaller markers might indicate lessor speed within a pre-determined range.

The present invention performs the above-described techniques by means of a formatting object that is executed on a computer system. The formatting object accomplishes this by defining at least one format map that comprises one or more mapping segments. Each mapping segment includes a beginning boundary value, an ending boundary value, at least one beginning visual attribute corresponding to the beginning boundary value, and at least one ending visual attribute corresponding to the ending boundary value. During execution, the format map is associated with a particular variable for which at least one data value is retrieved from a data file. For each mapping segment, the system associates the beginning boundary value of the mapping segment with the beginning visual attribute of the mapping segment to define a first mapping point, and associates the ending boundary value of the mapping segment with the ending visual attribute of the mapping segment to define a second mapping point. If a given data value falls between the beginning and ending boundary values of a given mapping segment, the system applies interpolation techniques in combination with the data corresponding to the first and second mapping points to determine one or more visual attributes corresponding to the data value. The system may then express the data value by associating these visual attributes with a visual object, such as a character in a table or a marker in a chart.

The present invention can express the boundary values of each mapping segment as real numbers (absolute boundary values) or as percentages (relative boundary values). Absolute boundary values do not change when a given set of data is received by the formatting object. Thus, if the formatting object receives a data value that is outside of the absolute boundary values of all of the mapping segments within a given format map, the system will not apply the format map to that data value.

Relative boundary values are expressed in relation to the ranges of data values received by the formatting object. These relative boundary values are converted into absolute boundary values for each set of data received by the system. Thus, relative boundary values can change in response to each set of data received by the system. For example, if a mapping segment is defined to have a beginning boundary value of 20% and an ending boundary value of 100%, and the formatting object receives data values for a given variable that range between 0 and 100, the mapping segment will have beginning and ending boundary values of 20 and 100, respectively, for that particular set of data. If the system later receives a set of data for the same variable that ranges between 0 and 200, the mapping segment will have beginning and ending boundary values of 40 and 200, respectively.

If desired, a given mapping segment may be defined to have mixed types of boundary values. For example, a given mapping segment may be defined to have a relative beginning boundary value and an absolute ending boundary value.

In another aspect of the invention, the various mapping segments within a format map are defined to have two or more equal divisions. If a mapping segment is defined to have such divisions, the formatting object divides the mapping segment equally into the number of divisions specified by the author or user. During this process, the formatting object defines each division to have a beginning division value and an ending division value. The system then associates a visual attribute with each division. During execution, the formatting object receives a given range of data values for a given variable, and then converts any relative boundary values into absolute boundary values, and any relative division values into absolute division values. Next, for each data value, the system determines whether the data value falls between beginning and ending division values of a particular division within a mapping segment of the format map. If so, the system associates the data value with the visual attribute corresponding to that division. The system may then express the data value by associating the identified visual attribute with an appropriate visual object.

In yet another aspect of the invention, a given format map includes a plurality of mapping segments. These mapping segments can overlap, and, as discussed above, can include different types of boundary values. The format map can comprise a first mapping segment that has absolute beginning and ending boundary values, and a second mapping segment that has relative beginning and ending boundary values. Similarly, a given chart or table can include a plurality of format maps.

The various aspects of the present invention may be more clearly understood and appreciated from a review of the following detailed description of the disclosed embodiments and by reference to the appended drawings.

BRIEF DESCRIPTION OF THE DRAWINGS

FIG. 1 is a prior art chart that represents the motion of a projectile in the X-Y plane.

FIG. 2 is a prior art chart that represents the three-dimensional motion of a projectile.

FIG. 3 is a prior art chart that represents the three-dimensional motion of a projectile over time.

FIG. 16 is a diagram of the two format maps that were used to modify the visual characteristics of the markers in the chart of FIG. 4.

DETAILED DESCRIPTION

Figure 4:
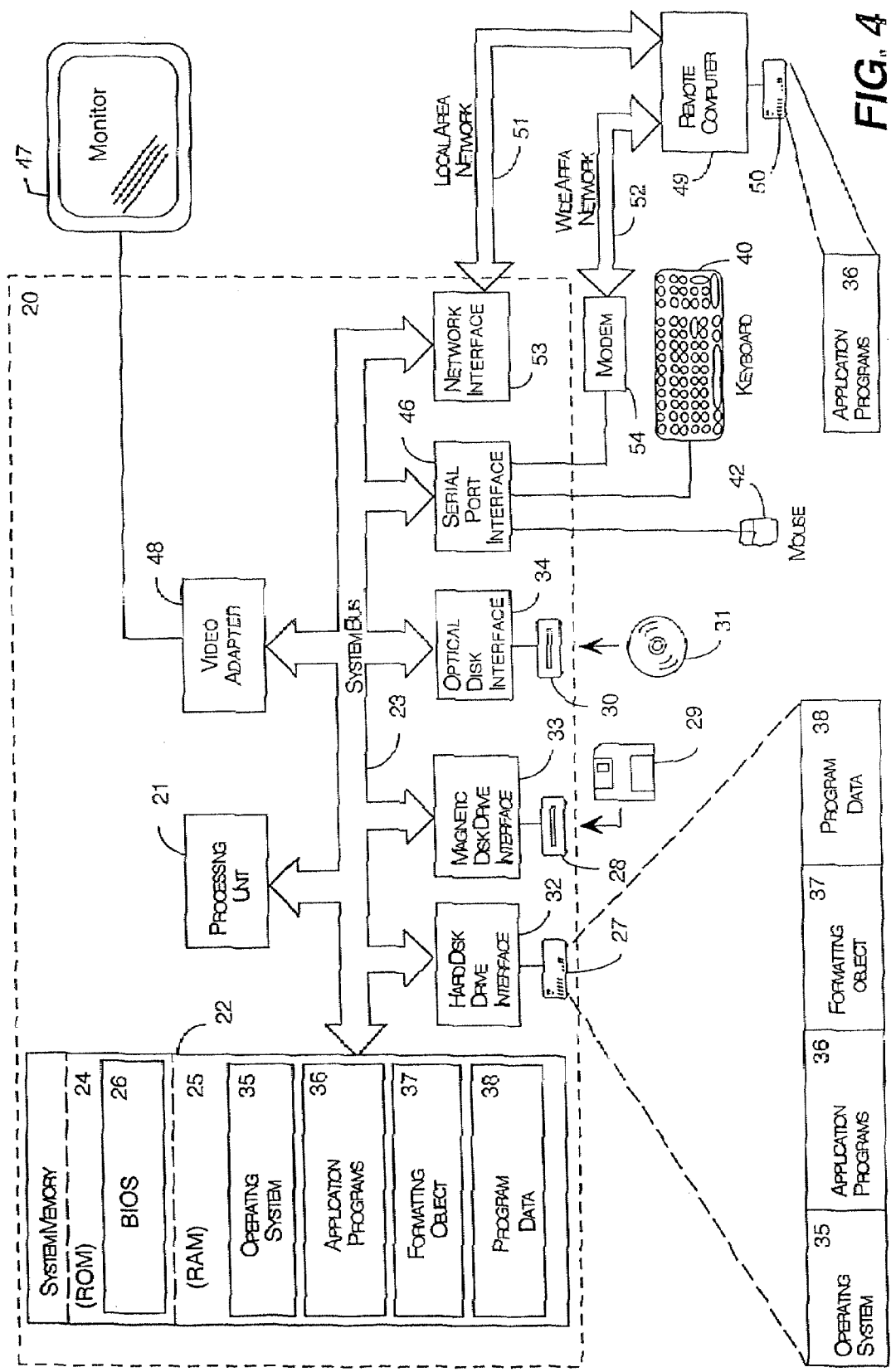
FIG. 4 is a block diagram of a personal computer that is an exemplary operating environment for an embodiment of the present invention.

The present invention is directed to a method and a computer readable medium for modifying the visual attributes of visual objects to reflect data values. Such visual attributes include color and structural visual attributes (all visual attributes other than color). Structural visual attributes include such attributes as, for example, fill type, border width, line width, line style, font size, marker size and marker type.

The present invention may be implemented as a formatting object that is employed in conjunction with an application program that is capable of displaying visual representations of data, such as charts and graphs. In an exemplary embodiment of the invention, the formatting object is embodied in a dynamic-link library (DLL) that is used in conjunction with a spreadsheet program such as "MICROSOFT EXCEL", which is published by the Microsoft Corporation of Redmond, Wash. In an alternative embodiment of the invention, the formatting object is be embodied directly in the spreadsheet program.

In a further alternative embodiment of the invention, the formatting object is embodied in a DLL that is used in conjunction with a web page written in Hypertext Markup Language (HTML). When a user accesses the web page using an internet browser program such as "INTERNET EXPLORER" (which is published by the Microsoft Corporation of Redmond, Wash.), the HTML code used to create the web page may instruct the browser to download one or more DLL's that embody the formatting object. The browser then downloads the appropriate DLL's from a server onto the client running the browser. The DLL's may then be used to implement the formatting object according to the present invention.

In all of the above embodiments of the invention, the formatting object modifies the visual attributes of characters or markers to convey data to the reader. Thus, the formatting object may emphasize data within a table or a chart by modifying the visual attributes of characters or markers within the table or chart if the characters or markers represent values meeting specified criteria. For example, the formatting object may be used to emphasize all data points with negative values by increasing the line width of all characters or markers that represent data points having values less than zero.

Similarly, the formatting object may be used to increase information density within a table or chart, and to elegantly represent the relationships between four or more interrelated variables in a two-dimensional chart. The formatting object accomplishes this by associating data values with corresponding visual attributes. The formatting object then applies the visual attributes to a character or marker within a table, chart, or other visual representation to visually express the data values. Thus, for example, the formatting object might vary the size of a marker within a chart in proportion to a variable such as speed. In such a chart, large markers might indicate greater speed and smaller markers might indicate lessor speed within a pre-determined range.

Thus, a formatting object according to the present invention may be applied within an application program or a web page to emphasize or condense visual representations of data.

An Exemplary Operating Environment

FIG. 1 and the following discussion are intended to provide a brief, general description of a suitable computing environment in which the invention may be implemented. While the invention will be described in the general context of an application program and dynamic-link library (DLL) that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more spreadsheet client application programs 36, and a formatting object 37. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Interaction Between the Formatting Object and the Application Program

Figure 5:
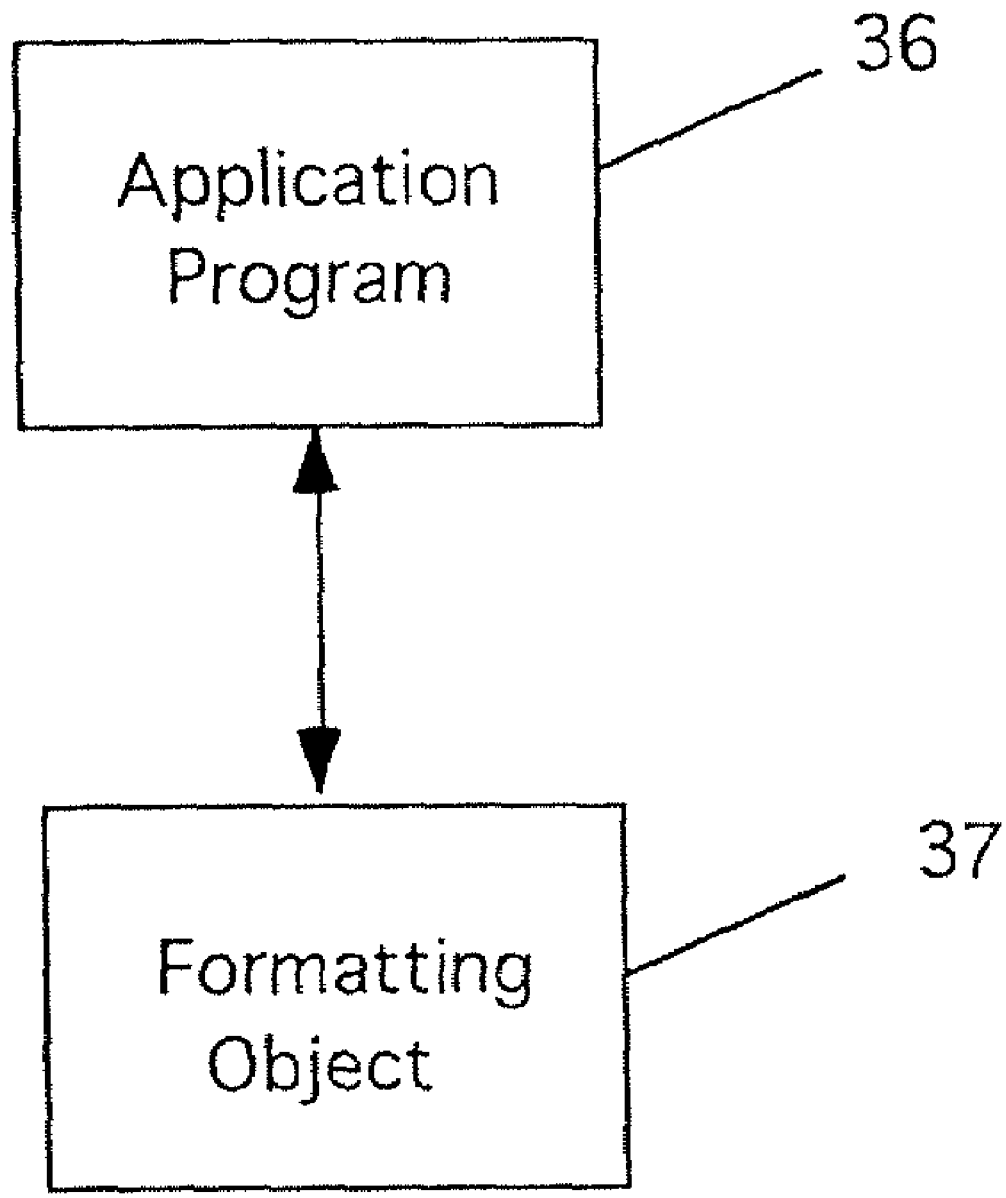
FIG. 5 is a block diagram illustrating the interaction between the major program modules employed in an embodiment of the present invention.

The formatting object 37 can be implemented as a dynamic-link library (DLL). FIG. 5 depicts a block diagram illustrating the interaction between the major program modules employed in an embodiment of the present invention. Generally stated, a DLL is an executable routine, stored as an independent file, that can be loaded on an as-needed basis by program modules that "call" the DLL. An application program 36 can call a DLL to perform a specific function, thereby eliminating the need for the application program 36 to provide the function itself. For example, the "MICROSOFT EXCEL" application program (or another application program) can call the formatting object 37 when it is desirable to apply a format map to a visual object.

A call to a DLL often passes some information to the DLL that the DLL uses to perform its specified function. For example, the "MICROSOFT EXCEL" application program may pass a group of data values in a call to the formatting object 37 so that the formatting object 37 may associate the appropriate visual characteristics with each of the data values.

Once the formatting object 37 has associated the appropriate visual characteristics with each of the data values, the formatting object 37 can pass data to the "MICROSOFT EXCEL" application program. Such data may indicate how the visual objects that correspond to the various data values should be formatted to reflect the data values. The two-way arrows depicted in FIG. 5 indicate the ability of the DLL module of an exemplary embodiment of the present invention to make and accept calls and to return information to the calling module or program.

General Performance of the Formatting Object

As noted above, the formatting object may be used to emphasize data within a table or a chart by modifying the visual attributes of characters or markers within the table or chart if the characters or markers represent values meeting specified criteria. To accomplish this, a user or author of the formatting object first specifies which data is to be emphasized. For example, the user may specify that all negative values of a particular variable should be emphasized. The user or author then specifies how the data to be emphasized should be visually set apart from other data within the table or chart. Thus, for example, the user or author may specify that all of the characters in a table corresponding to negative values of a certain variable should have a different font size than characters in the table that correspond to values of zero or above.

Alternatively, the user or author might, for example, specify that all characters in a table should be sized in proportion to the value of a certain variable displayed in the chart. For example, in a table displaying the heights of various individuals, a user or author might specify that the height entries within the table should be sized in proportion to the values that they represent. Thus, as shown in Table 3, the font size of characters representing a height of 5'0" would be smaller than the font size of characters representing greater heights of 5'4", 5'8" and 6'2". Such a technique serves to emphasize data within the table and to maximize the visual impact of the data upon the reader.

TABLE 3

Table Emphasizing the Height Differences of Various Individuals

| Individual | Height |
|---|---|
| Bob | 5'0" |
| Steve | 5'4" |
| Paul | 5'8" |
| John | 6'2" |

Using the technique described above, the formatting object may be used to condense a table (and thus increase the information density of the table) by modifying the visual attributes of the entries within the table's first column to convey the data in the table's second column. By doing this, the formatting object can condense the table by eliminating the second column of information from the table. Thus, as shown in Table 4, the "height" column of Table 3 may be eliminated by sizing the names of the individuals in proportion to their respective heights. If desired, a legend may be included to indicate the precise relationship between the visual attribute and the data represented by the visual attribute.

TABLE 4

Condensed Table Indicating the Relative Heights of Various Individuals

Individual

Bob
Steve
Paul
John

The formatting object may similarly be used to increase the information density within a chart by modifying the visual attributes of markers within the chart to convey additional data to the user. Such a technique may be used to portray the relationships between four or more interdependent variables within a two-dimensional chart. For example, the invention may be used to portray the following tabular information in a two-dimensional chart.

TABLE 5

Name, Age, Weight and Height of Various Individuals

| Name | Age | Weight | Height |
|---|---|---|---|
| Bob | 25 | 140 lbs | 5'0" |
| Steve | 28 | 160 lbs | 5'4" |
| Paul | 35 | 180 lbs | 5'8" |
| John | 32 | 200 lbs | 6'2" |

Figure 6:
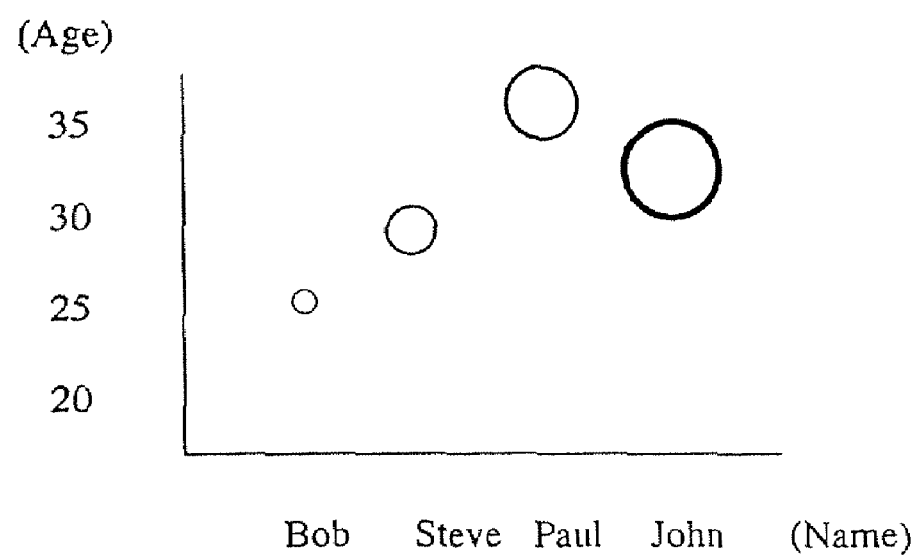
FIG. 6 is a chart that represents the name, age, weight, and height of various individuals.

This may be done, for example, by specifying that the size of each individuals' marker should correspond to the individuals' height, and that the line thickness of each individual's marker should correspond to the individual's weight. A chart according to these specifications is shown in FIG. 6. As noted above, if desired, a legend may be included to indicate the precise relationship between the visual attribute and the data represented by the visual attribute.

The Use of Format Maps within the Formatting Object

As mentioned above, in one embodiment of the invention, the formatting object may modify the visual attributes of characters or markers to reflect the value of one or more variables. The formatting object may accomplish this by allowing a user or author to define a format map comprising one or more mapping segments. These mapping segments define the relationship between a series of data values to be expressed and the visual attributes that correspond to each of these data values. Once defined, a format map may be used to associate a series of data values with formatting attributes that correspond to the individual data values within the series.

Figure 7:
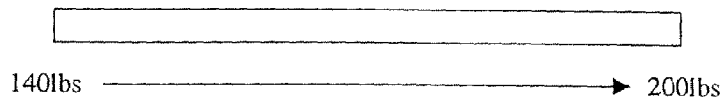
FIG. 7 is a diagram of a format map having a beginning boundary value of 140 lbs and an ending boundary value of 200 lbs.

To define a format map, a user or author must first define the mapping segments that comprise the format map. To define a mapping segment, the user first specifies the beginning and ending boundary values of the mapping segment. For example, as shown in FIG. 7, the user might define a beginning boundary value of 140 lbs and an ending boundary value of 200 lbs.

Figure 8:
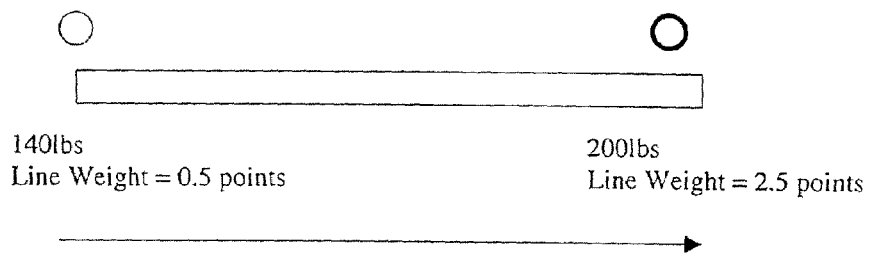
FIG. 8 is a diagram of a format map with a single mapping segment. The mapping segment has a beginning boundary value of 140 lbs, an ending boundary value of 200 lbs, a beginning visual attribute of Line Weight=0.5 points, and an ending visual attribute of Line Weight=2.5 points.
Figure 9:
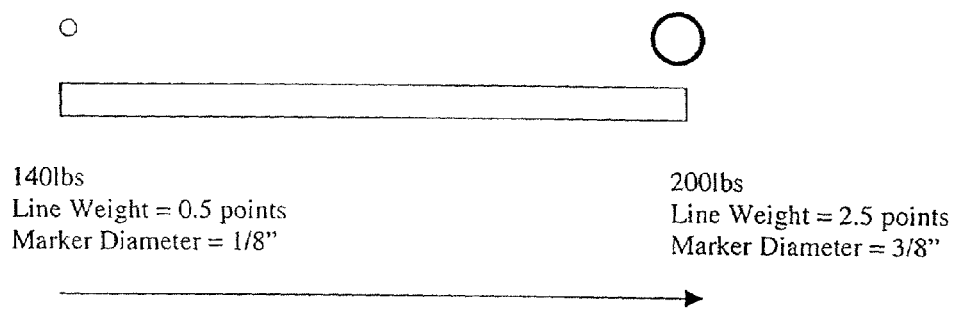
FIG. 9 is a diagram of a format map with a single mapping segment. The mapping segment has a beginning boundary value of 140 lbs, an ending boundary value of 200 lbs, beginning visual attributes of Line Weight=0.5 points and Marker Diameter=⅛", and ending visual attributes of Line Weight=2.5 points and Marker Diameter=⅜".

Next, the user or author specifies one or more visual attributes that correspond to the mapping segment's boundary values. For example, as shown in FIG. 8, the user might specify that the beginning boundary value corresponds to a marker line weight of 0.5 points and that the ending boundary value corresponds to a marker line weight of 2.5 points. As shown in FIG. 9, the user might further specify that the beginning boundary value corresponds to a marker diameter of ⅛" and that the ending boundary value corresponds to a marker diameter of ⅜". Knowing that the beginning boundary value (140 lbs) corresponds to certain beginning visual attributes (marker line weight=0.5 points, marker diameter=⅛"), and that that the ending boundary value (200 lbs) corresponds to certain ending visual attributes (marker line weight=2.5 points, marker diameter=⅜") supplies sufficient information to allow the system to use interpolation techniques (such as standard linear interpolation techniques) to calculate the visual attributes that correspond to any data value between the specified boundary values.

Figure 10:
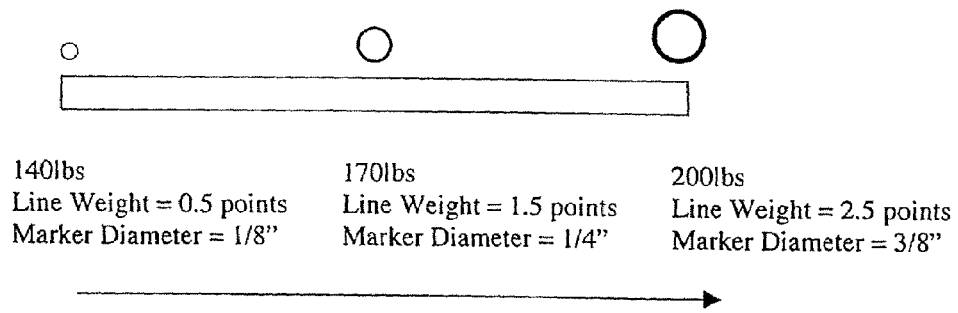
FIG. 10 is a diagram of the format map of FIG. 9 that represents an individual data point (170 lbs) according to the format map of FIG. 9.

To apply standard linear interpolation techniques, the formatting object treats the beginning boundary value and the beginning visual attributes as a first mapping point, and the ending boundary value and the ending visual attributes as a second mapping point. By doing this, the formatting object may determine the visual attributes that correspond to any data value between the specified boundary values by using the following formula, which is simply a variation of the standard formula used to perform linear interpolation:

$$VA=BFA+[(EFV-BFV)/(EDV-BDV)]*(DV-BDV)$$

where VA=at least one visual attribute
BFV=Beginning format value
EFV=Ending format value
BDV=Beginning data value
EDV=Ending data value
DV=At least one data value Thus, the system may use interpolation techniques to calculate the appropriate visual attributes for each data point within a given mapping segment for a table or chart. For instance, as shown in FIG. 10, the system may use linear interpolation techniques in the example above to determine that a weight of 170 lbs corresponds to a line weight of 1.5 points and a marker diameter of ¼".

Applying these same interpolation techniques, the formatting object will apply a uniform visual format throughout a given mapping segment if the beginning value of a particular visual format is equal to the ending value of the visual format. For example, if the user specifies that the beginning boundary value of a mapping segment corresponds to a line weight of 0.5 points and that the ending boundary value of the mapping segment also corresponds to a line weight of 0.5 points, all data points within the mapping segment will have a line weight of 0.5 points.

The system may interpolate data values within a mapping segment continuously (as described above) or it may interpolate the data values discretely into a number of specified divisions. Thus, if a mapping segment is defined as having a number of discrete divisions for interpolation purposes, the formatting object divides the mapping segment equally into the specified number of divisions. In doing so, the formatting object determines a beginning division value and an ending division value for each division, and assigns an appropriate visual attribute to each division. The formatting object may then receive a set of data values and apply discrete interpolation techniques to determine the visual format that corresponds to each data value within the set of data values. To do this, the formatting object identifies a target division for each data value that has a beginning division value that is less than the data value and an ending division value that is greater than the data value. The formatting object then associates the data value with the visual attribute of the target division.

Figure 11:
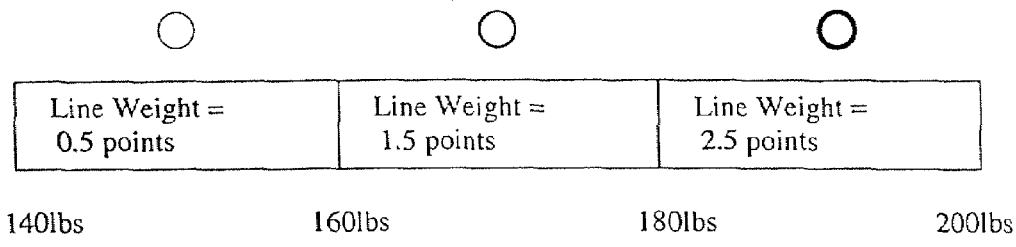
FIG. 11 is a diagram of a format map comprising a single mapping segment, which is divided into three equal divisions.

For example, to apply discrete interpolation techniques in the illustration above, the user may define a format map that is comprised of a single mapping segment having three equal mapping segment divisions. An example of such a format map is shown in FIG. 11. In this example, data values of 140-160 lbs would correspond to a marker line weight of 0.5 points, data values of 160-180 lbs would correspond to a marker line weight of 1.5 points, and data values of 180-200 lbs would correspond to a marker line weight of 2.5 points.

Figure 12:
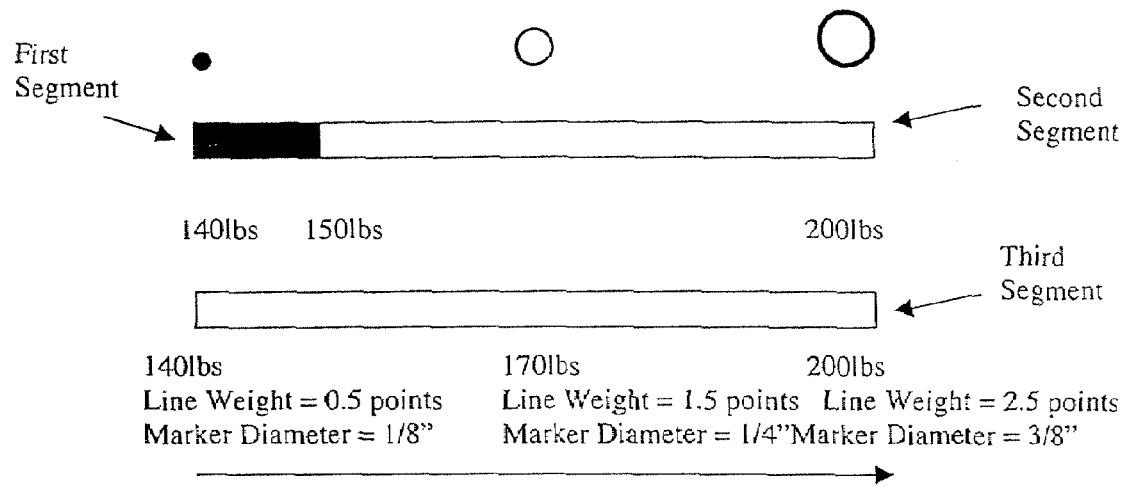
FIG. 12 is a diagram of a format map having three mapping segments.

A user or author may also define multiple mapping segments within a single format map. If desired, such multiple mapping segments may overlap. Multiple mapping segments may be used to visually express a subset of data values within a format map differently from other values within the format map. Returning to the example above, the user or author may wish to emphasize individuals who weigh 150 lbs or less by changing the fill type of markers corresponding to such individuals. To construct such a format map, a user or author would first define a first mapping segment that has a beginning boundary value of 140 lbs and an ending boundary value of 150 lbs, and that defines the marker fill type to be a solid black fill. Next, the user would define a second mapping segment that has a beginning boundary value of 150 lbs and an ending boundary value of 200 lbs, and that defines the marker fill type to be a solid white fill. Optionally, the user or author may then define additional mapping segments, overlapping the first and second mapping segments, to express additional aspects of the data. For example, the user or author may define a third mapping segment, with a beginning boundary value of 140 lbs and an ending boundary value of 200 lbs that sizes the diameter and line weight of the markers within a chart to in proportion to weight. A format map including the three mapping segments described above is shown in FIG. 12.

As shown above, it is possible to include mapping segments that are continuously interpolated (such as the first mapping segment, above) and mapping segments that have a uniform format throughout the mapping segment (such as the second and third mapping segments, above) within the same format map.

Each boundary value of the individual mapping segments within a format map may be defined as either a real number or as a percentage. Boundary values defined as real numbers are referred to as "absolute boundary values." Boundary values defined as percentages are referred to as "relative boundary values."

Absolute boundary values provide fixed boundary values that do not change in relation to a given set of data received by the system. The function of fixed boundary values may be illustrated in an example in which: (1) a format map is defined to have a single mapping segment with an absolute beginning boundary value of 100 lbs and an absolute ending boundary value of 180 lbs; and (2) the system receives a series of weights ranging between 200 lbs and 300 lbs. In this example, the beginning and ending boundary values would not change in response to receiving the series of values, even though all of the values within the series fall outside of the mapping segment. Also, because none of the weights received by the system fall between the boundary values of the format map's mapping segments, the format map would not be applied to any of the values.

Relative boundary values provide flexible boundary values that change in relation to a given set of data received by the system. If a format map contains a mapping segment having a relative boundary value, the system converts the relative boundary value into an absolute boundary value using following formula each time the system receives a set of data:

$$ABV=LV+(RBV/100)*\text{Absolute Value}[HV-LV]$$

where ABV=absolute boundary value
LV=lowest value received by the system
RBV=relative boundary value
HV=highest value received by the system For example, if a user defines a format map having a single mapping segment with a relative beginning boundary value of 20% and a relative ending boundary value of 100% and the system receives a series of weights ranging between 200 lbs and 300 lbs, the system will apply the formula above to derive a beginning boundary value of 220 lbs and an ending boundary value of 300 lbs. Similarly, if the formatting object were to later receive a series of weights ranging from 100 lbs to 200 lbs, the formatting object would apply the formula above to derive a different set of boundary values in which the beginning boundary value is 120 lbs and the ending boundary value is 200 lbs. Thus, relative boundary values allow the boundary values of the mapping segments within a given format map to change in relation to the data presented to the system.

Figure 13:
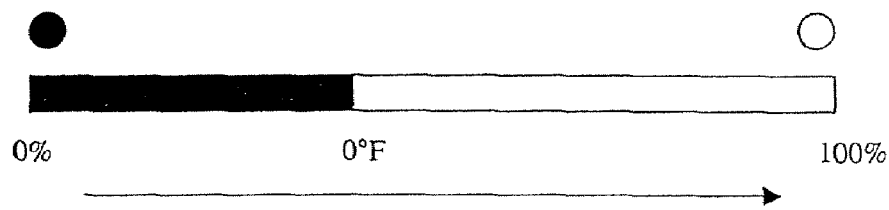
FIG. 13 is a diagram of a format map that emphasizes all negative temperatures displayed on a chart by applying a solid black fill to all markers that correspond to temperatures less than 0° F.

It is possible, and often desirable, to define one boundary value of a given mapping segment as absolute and to define the other boundary value of the mapping segment as relative. For example, when applying a format map to a given range of temperatures, a user might define a first mapping segment with a beginning boundary value of 0% and an ending boundary value of 0° F. The user may further specify that the fill type for all markers within this mapping segment is solid black. The user might also define a second mapping segment with a beginning boundary value of 0° F. and an ending boundary value of 100% in which the fill type for all markers is solid white. Such a format map, shown in FIG. 13, would emphasize all negative temperatures displayed on a chart by applying a solid black fill to all markers that correspond to temperatures that are less than 0° F.

In cases where one of a mapping segment's boundary values is absolute and the mapping segment's other boundary value is relative, the system will not apply the mapping segment to a given set of data if, after the mapping segment's relative boundary value is converted to an absolute boundary value, the mapping segment's beginning boundary value is greater than the mapping segment's ending boundary value. Such a situation would occur, for example, if the beginning boundary value of a particular mapping segment were defined as 0%, the ending boundary value were defined as 0° F., and the system received a set of temperatures ranging between 30° F. and 70° F. Because the relative beginning boundary value (0%) would correspond to an absolute beginning boundary value of 30° F., and because this beginning boundary value is greater than the ending boundary value of the mapping segment (0° F.), the system would not apply the mapping segment to this particular set of data.

Figure 14:
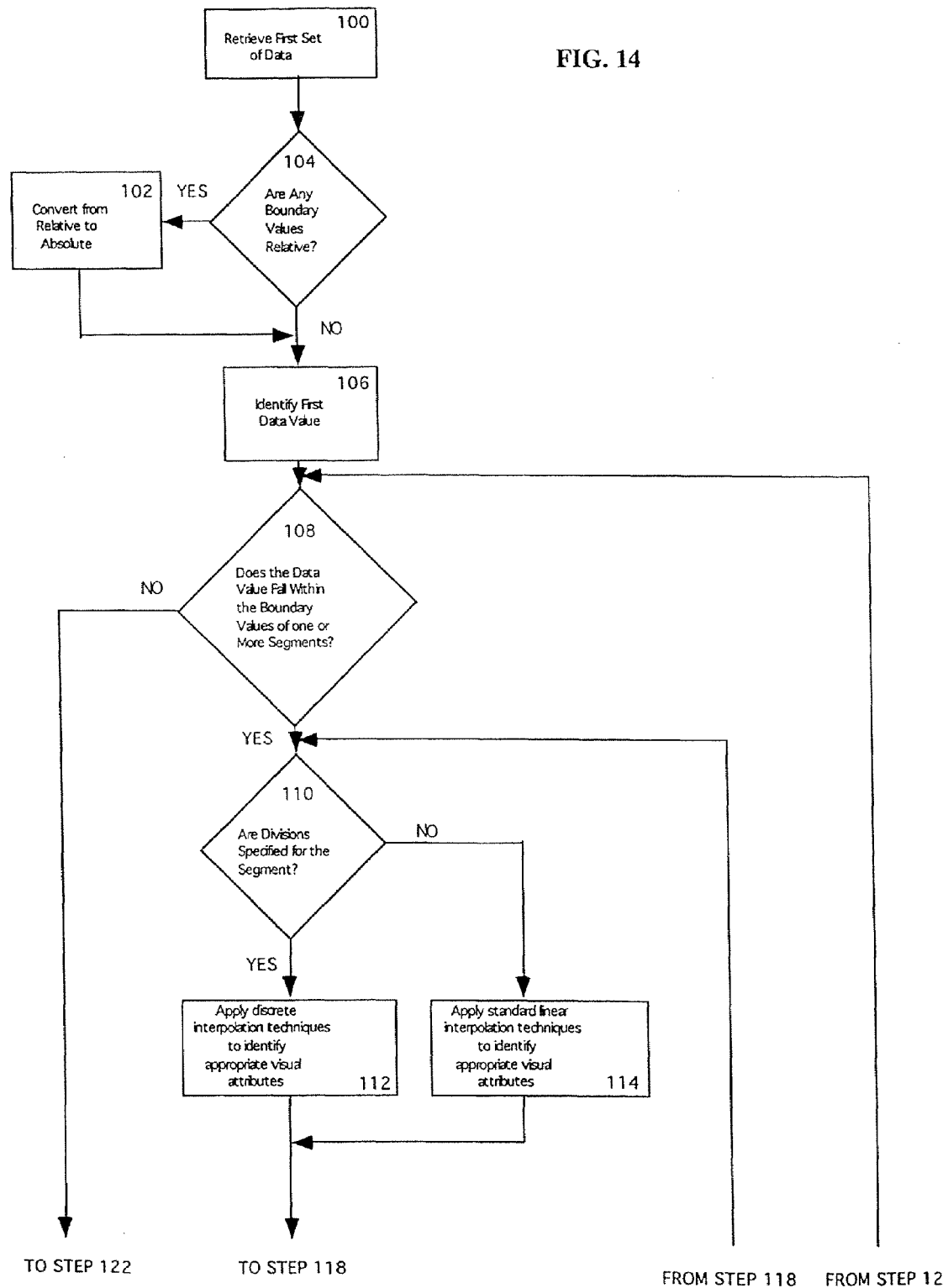
FIGS. 14 and 15 are parts of a single flow chart that represents an exemplary method for applying a format map to a set of data.
Figure 15:
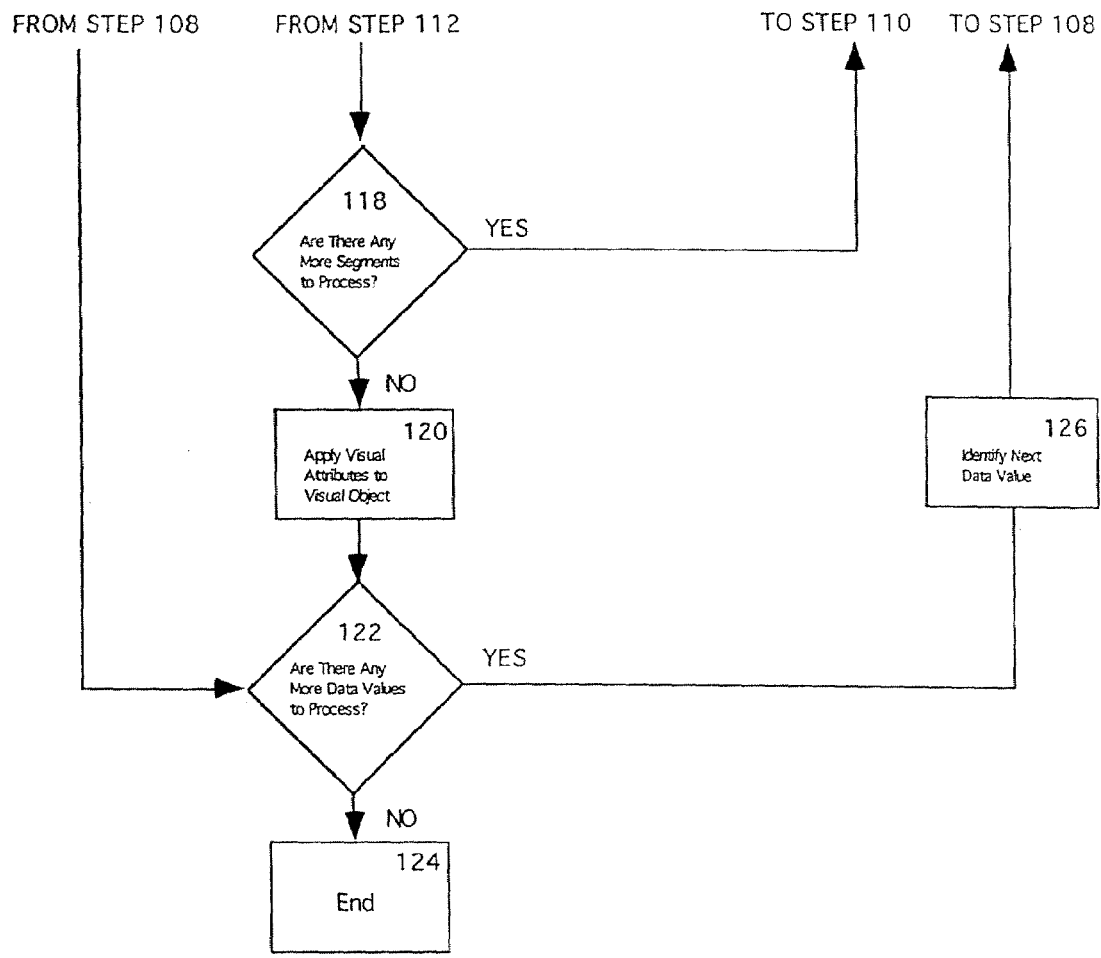

FIGS. 14 and 15 depict an exemplary method for applying a format map to a given set of data. First, in step 100, a first set of data is retrieved from a data file. Next, in step 104, a determination is made as to whether the various segments of the format map include any relative boundary values. If so, the relative boundary values are converted into absolute boundary values in step 102. Next, a first data value is identified in step 106 and then, in step 108, a determination is made as to whether the data value falls between the beginning and ending boundary values of any of the format map's mapping segments. If not, the method proceeds to step 122, which is described below. If so, a determination is made, in step 110, as to whether a number of divisions have been specified for the first identified segment. If so, discrete interpolation techniques are applied in step 112 to identify the visual attributes that correspond to the data value. If not, standard linear interpolation techniques are applied in step 114 to identify the visual attributes that correspond to the data value. Steps 110-118 are then repeated, as appropriate, for each segment identified in step 108. Next, in step 120, the identified visual attributes are applied to a visual object, such as a character in a table or a marker in a chart, corresponding to the data value.

The method then proceeds to step 122 and the process is repeated for each data value in the set of data values retrieved in step 100.

An additional aspect of the present invention is that multiple format maps may be simultaneously applied to a given character or marker. This allows the user to express the values of two or more different variables by modifying the visual attributes of a single character or marker. For example, in the chart shown in FIG. 6, above, a first format map was used to modify the line weight of each marker in proportion to the weight of the individual represented by the marker and a second format map was used to modify the diameter of each marker in proportion to the height of the individual represented by the marker. These first and second format maps were defined as shown in FIG. 16.

Thus, by applying two format maps to a single set of markers, a formatting object according to the present invention may modify a chart, such as the chart shown in FIG. 6, so that the chart conveys information corresponding to two different variables (weight and height) through the visual attributes of each individual marker. This technique allows the user or author to represent the values of multiple variables through the visual attributes of a single character or marker.

Figure 17:
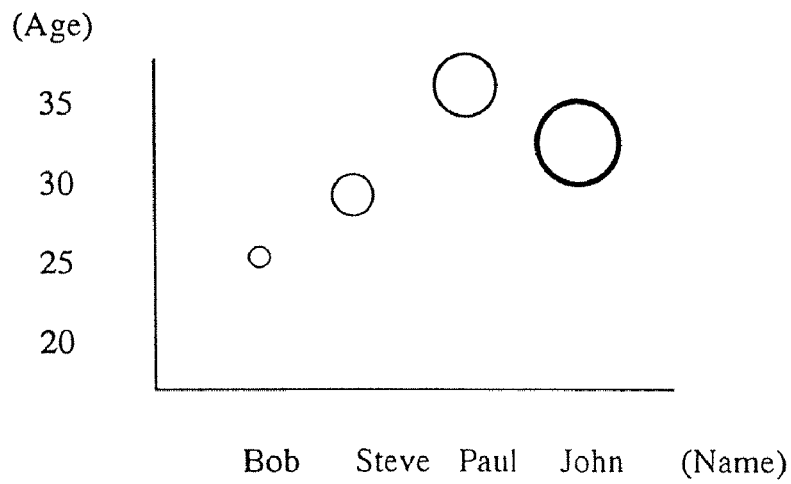
FIG. 17 is a chart that includes a legend and that represents the Name, Age, Weight, and Height of various individuals.

To aid a reader in interpreting visual representations generated using the invention, the system may generate a legend that indicates the meaning of the various visual attributes of characters and markers generated by the invention. An example of such a chart is shown in FIG. 17.

A preferred embodiment of the invention may be used by document authors or by end-users. For example, an author of a web page may use this embodiment to create a chart or table to be displayed on the web page. An end user of the web page may later use a simplified embodiment of the invention to further modify the visual attributes of the information within the chart or table.

While this invention has been described in specific detail with reference to the disclosed embodiments, it will be understood that many variations and modifications may be made within the spirit and scope of the invention as described in the appended claims.

We claim:

1. A computer implemented method for displaying a visual object corresponding to a first data value of a first cell in a displayed table, the method comprising:

applying a first structural visual attribute associated with the first data value to a display of the visual object;

establishing a mapping segment associated with a second structural visual attribute, wherein the mapping segment comprises a first beginning boundary value and a first ending boundary value;

determining whether a second data value of a second cell in the displayed table is within the first beginning boundary value and the first ending boundary value, wherein the second data value is associated with the visual object;

in response to determining that the second data value is within the first beginning boundary value and the first ending boundary value, applying the second structural visual attribute to the display of the visual object.

2. The method of claim 1, wherein the visual object is a marker displayed in a chart or graph.

3. The method of claim 1, wherein the visual object is a cell displayed in a table.

4. The method of claim 1, wherein at least one of the first beginning boundary value and the first ending boundary value is an absolute value.

5. The method of claim 1, wherein at least one of the first beginning boundary value and the first ending boundary value is a relative value.

6. The method of claim 1, wherein the first and second structural visual attribute is selected from the group consisting of fill type, border width, line width, line style, font size, visual object size and visual object type.

7. The method of claim 1, wherein the method is performed within a spreadsheet program.

8. The method of claim 1, wherein the method is performed within a web page.

9. The method of claim 1, wherein the mapping segment includes a plurality of divisions, each division having a beginning division boundary value and an ending boundary value, each division being associated with a different structural visual attribute value.

10. The method of claim 1, wherein the mapping segment includes a first mapping segment associated with the second structural visual attribute, and a second mapping segment associated with a third structural visual attribute different than the first and second structural visual attribute, the second mapping segment comprising a second beginning boundary value and a second ending boundary value, the method further comprising determining whether the second data value is within the second beginning boundary value and the second ending boundary value, and in response to determining that the second data value is within the second beginning boundary value and the second ending boundary value, applying the third structural visual attribute to the display of the visual object.

11. The method of claim 10, wherein the first mapping segment overlaps at least a portion of the second mapping segment.

12. A computer implemented method for displaying a visual object corresponding to a first data value of a first cell in a displayed table, the method comprising:

receiving a format map comprising a plurality of mapping segments, wherein each mapping segment comprises a beginning boundary value and an ending boundary value and is associated with a different structural visual attribute;

determining whether the data value is within the beginning boundary value and the ending boundary value of a first mapping segment of the plurality of mapping segments; and in response to determining that the data value is within the beginning boundary value and the ending boundary value of the first mapping segment of the plurality of mapping segments, applying the structural visual attribute associated with the first mapping segment of the plurality of mapping segments to a display of the visual object;

determining whether the data value is within the beginning boundary value and the ending boundary value of a second mapping segment of the plurality of mapping segments; and in response to determining that the data value is within the beginning boundary value and the ending boundary value of the second mapping segment of the plurality of mapping segments, applying the structural visual attribute associated with the second mapping segment of the plurality of mapping segments to the display of the visual object.

13. The method of claim 12, wherein at least one mapping segment comprises a relative value as the beginning boundary value or the ending boundary.

14. The method of claim 13, wherein the relative value is a percentage.

15. The method of claim 12, wherein for each mapping segment the structural visual attribute is selected from the group consisting of fill type, border width, line width, line style, font size, visual object size and visual object type.

16. The method of claim 12, wherein the visual object is associated with a second cell having a second data value with a second structural visual attribute different from the specified structural visual attribute associated with the first of the plurality of mapping segments and the specified structural visual attribute associated with the second of the plurality of mapping segments.

17. A computer readable medium storing computer executable instructions for performing a method of displaying a visual object corresponding to a data value of a first cell in a displayed table, the method comprising:

receiving a first format map comprising a plurality of first mapping segments, wherein each first mapping segment comprises a beginning boundary value and an ending boundary value and is associated with a structural visual attribute;

displaying the table containing the first cell;

receiving a value for the first cell of the table;

determining whether the value is within the beginning boundary value and the ending boundary value of a first of the plurality of mapping segments; and in response to determining that the value is within the beginning boundary value and the ending boundary value of the first of the plurality of mapping segments, applying the specified structural visual attribute associated with the one of the plurality of mapping segments to a display of the visual object.

18. The computer readable medium of claim 17, wherein the method further comprises:

receiving a second format map comprising a plurality of second mapping segments, wherein each second mapping segment comprises a second beginning boundary value and a second ending boundary value and is associated with a second specified structural visual attribute different than the first structural visual attribute;

determining whether the value is within the second beginning boundary value and the second ending boundary value of a first of the plurality of second mapping segments; and in response to determining that the value is within the second beginning boundary value and the second ending boundary value of one of the plurality of second mapping segments, applying the second specified structural visual attribute associated with the one of the plurality of second mapping segments to the display of the visual object.

19. The computer readable medium of claim 17, wherein the visual object is associated with a second cell having a second data value with a second structural visual attribute different from the first structural visual attribute.

20. The computer readable medium of claim 19, further comprising in response to applying the visual attribute to the visual object, displaying the table without the first cell.

* * * * *